United States Patent [19]

Gabrysch

[11] Patent Number: 5,069,426
[45] Date of Patent: Dec. 3, 1991

[54] INTERNAL HYDRAULIC PIPE PUSHING APPARATUS

[76] Inventor: Anthony R. Gabrysch, 509 Suzanne St., Edna, Tex. 77957

[21] Appl. No.: 552,879

[22] Filed: Jul. 16, 1990

[51] Int. Cl.⁵ .............................................. B23P 19/04
[52] U.S. Cl. ..................................... 254/29 R; 29/234
[58] Field of Search ............... 254/29 R; 29/234, 237, 29/252; 228/49, 3; 269/43

[56] References Cited

U.S. PATENT DOCUMENTS

| | | | |
|---|---|---|---|
| 2,615,413 | 10/1952 | Adams et al. | 269/48.1 |
| 4,082,248 | 4/1978 | Hinrichsen | 254/29 R |
| 4,815,695 | 3/1989 | Akesaka | 254/29 R |

Primary Examiner—Robert C. Watson
Attorney, Agent, or Firm—Neal J. Mosely

[57] ABSTRACT

A hydraulic apparatus for pushing pipe into an underground pipe comprises a hydraulic cylinder mounted on two longitudinally spaced sets of three radially extending, equally spaced legs. The legs have adjustable locking devices for locking the hydraulic cylinder in place as required inside the one part of an underground pipe. The hydraulic cylinder also has a lock plate of a length longer than the diameter of the underground pipe which acts to anchor the hydraulic cylinder in place when the hydraulic cylinder is activated. The apparatus has a head or push plate attached to a ram or piston extending from the hydraulic cylinder and a hydraulic control valve controlling actuation of the cylinder. With the two sets of legs attached, the hydraulic cylinder is placed inside one part of an existing underground pipe which is near the part in need of repair and the legs adjusted to center the cylinder in place. The lock plate presses against the end of the underground pipe in which the cylinder is secured. The push plate contacts the end of the section of pipe which is to be pushed into the existing underground pipe in need of repair. The hydraulic cylinder is activated by the control valve and the ram and push plate push the repair pipe into the existing underground pipe.

14 Claims, 2 Drawing Sheets

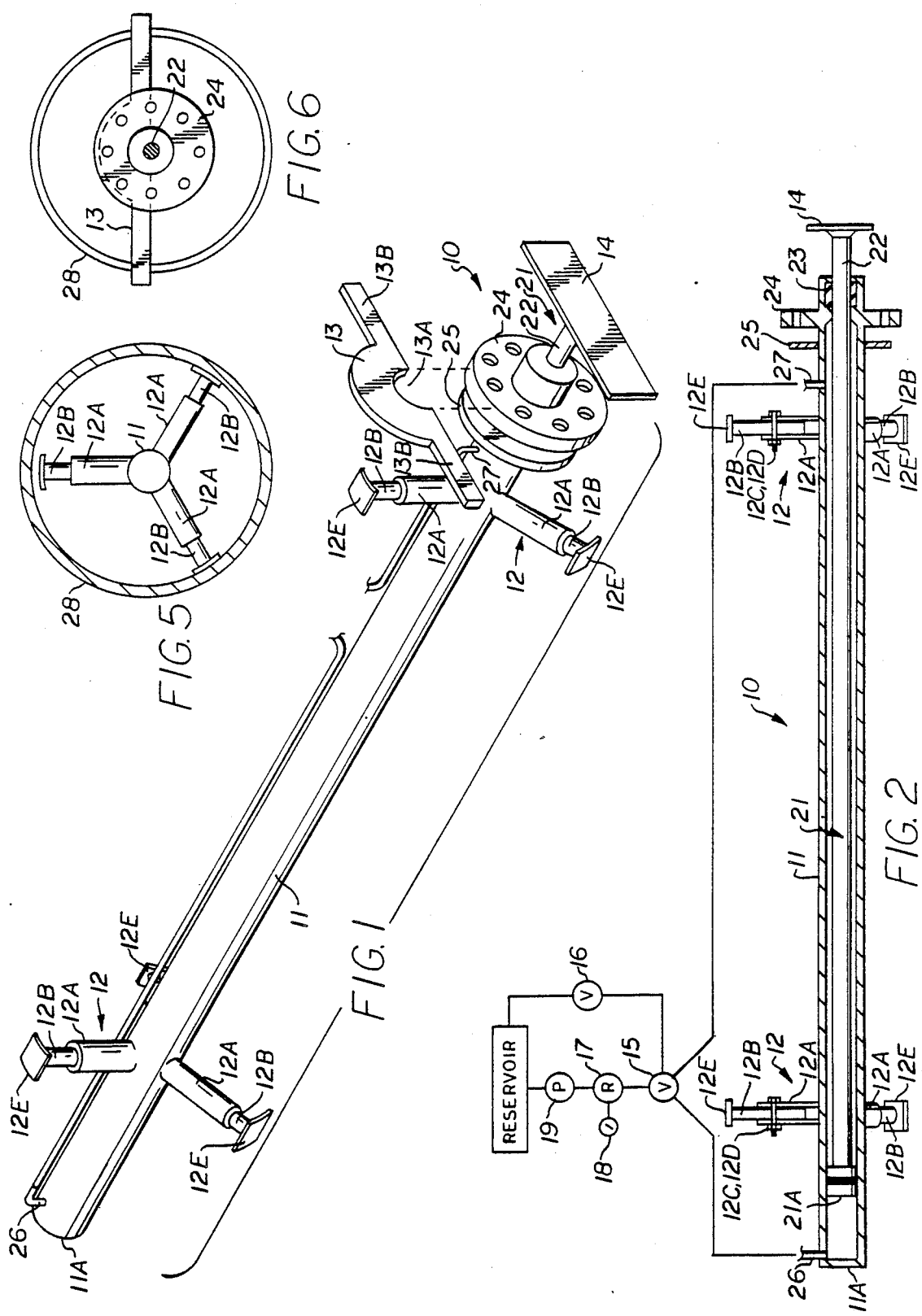

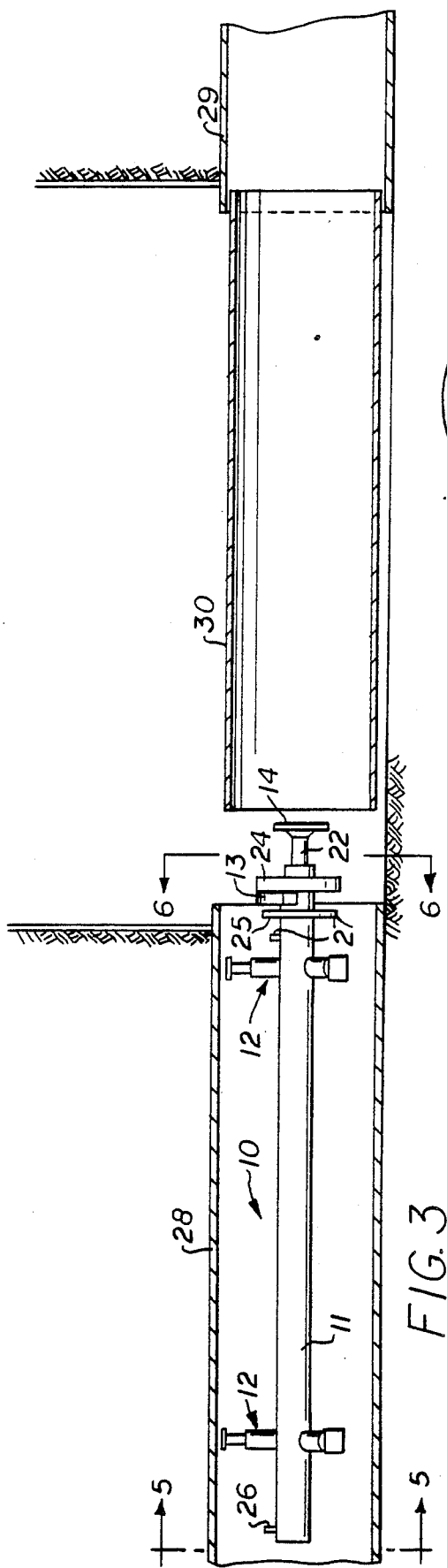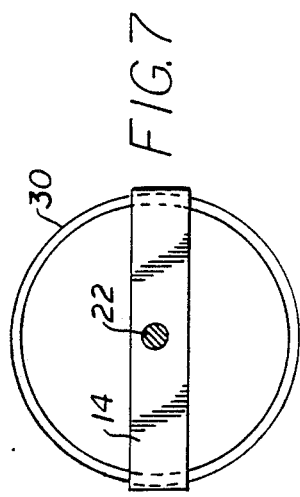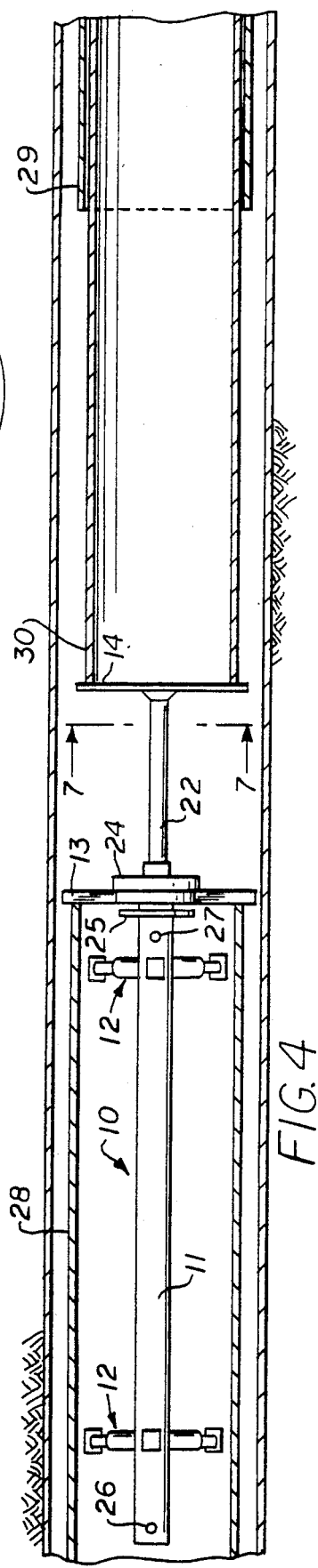

INTERNAL HYDRAULIC PIPE PUSHING APPARATUS

BACKGROUND OF THE INVENTION

1. Field of the Invention

This invention relates generally to an apparatus for moving cylindrical objects through the ground, and more particularly to hydraulically operated equipment for pushing pipe through existing underground pipe.

2. Brief Description of the Prior Art

The prior art includes several patented devices for pushing pipe in underground conduit. Some of the more pertinent devices are Reed U.S. Pat. No. 3,774,286; Schosek U.S. Pat. No. 4,274,758; Akesaka U.S. Pat. No. 4,662,606; and Shy U.S. Pat. No. 4,842,248.

Reed U.S. Pat. No. 3,774,286 discloses a machine including a frame adapted to be prepositioned in an excavation adjacent the open end of a long, straight run of an underground pipeline. The frame supports a power-actuated, reciprocable pusher head disposed—when the frame is in place in the excavation—in axial alignment with said open end of such run, and operative to successively, forcefully thrust liner pipe sections, in end-coupled relation, thereinto.

Schosek U.S. Pat. No. 4,274,758 discloses a pair of elongated abutment members provided in a parallel arrangement outwardly of respective sides of an underground pipe installer device. A link arrangement connects the abutment members to the respective sides in a manner whereby the spacing between the members may be forcibly expanded by utilizing the drive forces of the pipe installer by interconnecting an underground hole-forming rod, conventionally engaged in the installer to the link arrangement during a forward drive operation thereof.

Akesaka U.S. Pat. No. 4,662,606 discloses a pipe-propelling device comprising two sets of jack assemblies spaced from each other and arranged in the direction of propelling the pipe in a vertical shaft having a reacting shaft wall so that the small diameter pipe, such as water supply and drainage pipes, gas pipes and cable-laying pipes, can be propelled from the interior to the exterior of the vertical shaft by the extension of two sets of the jack assemblies.

Shy U.S. Pat. No. 4,842,248 teaches an hydraulic apparatus for pushing and pulling rod or pipe underground. The apparatus includes a frame for mounting an hydraulic cylinder and a carriage.

The present invention is distinguished over the prior art in general, and these patents in particular, by a hydraulic apparatus for pushing pipe into an underground pipe which comprises a hydraulic cylinder mounted on two longitudinally spaced sets of three radially extending, equally spaced legs. The legs have adjustable locking devices for locking the hydraulic cylinder in place as required inside the one part of an underground pipe. The hydraulic cylinder also has a lock plate of a length longer than the diameter of the underground pipe which acts to anchor the hydraulic cylinder in place when the hydraulic cylinder is activated. The apparatus has a head or push plate attached to a ram or piston extending from the hydraulic cylinder and a hydraulic control valve controlling actuation of the cylinder. With the two sets of legs attached, the hydraulic cylinder is placed inside one part of an existing underground pipe which is near the part in need of repair and the legs adjusted to secure the cylinder tightly in place. The lock plate presses against the end of the underground pipe in which the cylinder is secured. The push plate contacts the end of the section of pipe which is to be pushed into the existing underground pipe in need of repair. The hydraulic cylinder is activated by the control valve and the ram and push plate push the repair pipe into the existing underground pipe.

SUMMARY OF THE INVENTION

It is therefore an object of the present invention to provide an internal hydraulic pipe pushing apparatus of novel construction.

Another object of this invention is to provide an internal hydraulic pipe pushing apparatus which offers a simple design.

Another object of this invention is to provide an internal hydraulic pipe pushing apparatus which offers economy of manufacture.

Another object of this invention is to provide an internal hydraulic pipe pushing apparatus which offers ease of operation.

A further object of this invention is to provide an internal hydraulic pipe pushing apparatus which is practical, reliable, and durable.

A further object of this invention is to provide an internal hydraulic pipe pushing apparatus which can be used for pushing sections of pipe into existing underground horizontal pipes for repairing the pipes.

A still further object of this invention is to provide an internal hydraulic pipe pushing apparatus which includes a hydraulic cylinder, a control valve, spaced legs to center said apparatus inside a pipe, a lock plate on said hydraulic cylinder, a piston extending from said hydraulic cylinder, and a push plate attached to said piston at the end thereof for pushing pipe through an existing underground pipe when said hydraulic cylinder is activated.

A still further object of this invention is to provide an internal hydraulic pipe pushing apparatus which includes a hydraulic cylinder, a control valve for selectively activating said hydraulic cylinder, two sets of three radially-extending, equally-spaced legs adjustably secured on said hydraulic cylinder longitudinally spaced thereon means to lock said legs in an extended position during use to center said apparatus inside a pipe, a lock plate attached to said hydraulic cylinder, a piston extending from said hydraulic cylinder, and a push plate attached to said piston at the end thereof for pushing pipe through an existing underground pipe when said hydraulic cylinder is activated.

Other objects of the invention will become apparent from time to time throughout the specification and claims as hereinafter related.

The above noted objects and other objects of the invention are accomplished by a hydraulic apparatus for pushing pipe into an underground pipe which comprises a hydraulic cylinder mounted on two longitudinally spaced sets of three radially extending, equally spaced legs. The legs have adjustable locking devices for locking the hydraulic cylinder in place as required inside the one part of an underground pipe. The hydraulic cylinder also has a lock plate of a length longer than the diameter of the underground pipe which acts to anchor the hydraulic cylinder in place when the hydraulic cylinder is activated. The apparatus has a head or push plate attached to a ram or piston extending from the hydraulic cylinder and a hydraulic control valve controlling actuation of the cylinder. With the two sets of legs attached, the hydraulic cylinder is placed inside one part of an existing underground pipe which is near the part in need of repair and the legs adjusted to center the cylinder in place. The lock plate presses against the end of the underground pipe in which the cylinder is secured. The push plate contacts the end of the section of pipe which is to be pushed into the existing underground pipe in need of repair. The hydraulic cylinder is activated by the control valve and the ram and push plate push the repair pipe into the existing underground pipe.

BRIEF DESCRIPTION OF THE DRAWINGS

FIG. 1 is an isometric view of the internal hydraulic pipe pushing apparatus in accordance with the prevent invention.

FIG. 2 is a longitudinal cross-section of the internal hydraulic pipe pushing apparatus of FIG. 1.

FIG. 3 is a side elevation of the internal hydraulic pipe pushing apparatus shown installed in a pipe repair excavation prior to pushing a pipe into the existing pipe.

FIG. 4 is a top plan view of the repair excavation showing the internal hydraulic pipe pushing apparatus pushing the pipe into the existing pipe.

FIG. 5 is an end view taken along line 5—5 of FIG. 3 of the internal hydraulic pipe pushing apparatus within the existing pipe.

FIG. 6 is a cross-section view of the internal hydraulic pipe pushing apparatus taken along line 6—6 of FIG. 3 showing the lock plate engaged on the end of the pipe containing the apparatus.

FIG. 7 is a cross-section view taken along line 7—7 of FIG. 4 showing the push plate engaged on the end of the pipe being pushed.

DESCRIPTION OF THE PREFERRED EMBODIMENT

Referring to the drawings by numerals of reference, there is shown in FIGS. 1 and 2, a preferred internal hydraulic pipe pushing apparatus 10 in accordance with the present invention. Pipe pushing apparatus 10 comprises an elongate hollow cylinder 11 having an end wall 11A closing one end and a flange 24 at the opposite end. A seal 23 is contained in the flange 24. A second flange 25 may be installed behind the flange 24 for lifting the cylinder, as explained hereinafter. A piston member 21 is slidably received within the interior of the cylinder 11, has a piston head 21A at one end and an elongate piston shaft 22 secured thereto which extends substantially the full length of the cylinder 11 and through the seal or packing 23 in the flange 24. The seal or packing 23 forms a reciprocating sealing relation with the piston shaft 22. A generally rectangular push plate 14 is connected to the outer end of the piston shaft 22.

Inlet/outlet ports 26 and 27 extend through the side wall of the cylinder 11 near its rearward end and forward end, respectively. The ports 26 and 27 are connected to a source of pressurized hydraulic fluid by flexible conduit or hoses. Fluid flow into and out of the cylinder is accomplished by conventional hydraulic apparatus, such as pump 19, a three-way control valve 15 having a by-pass valve 16, a regulator 17 to regulate pressure applied to the hydraulic cylinder 11 and one or more pressure gauges 18 to monitor the system. Fluid is pumped under pressure behind the piston to move it forward to an extended position and in front of the piston to move it rearward to a retracted position.

A generally rectangular lock plate 13 is removably fitted between the flanges 24 and 25. The lock plate has an arcuate central portion 13A and laterally extending arms 13B which are of greater length than the diameter of the pipe into which the pipe pusher is to be installed.

Two sets of legs 12 are secured to the cylinder in longitudinally spaced relation, one near its forward end and the other set near its rearward end. Each set of legs 12 comprises circumferentially spaced outer tubular members 12A secured at one end to the cylinder 11 to extend radially outward therefrom. A shaft 12B is slidably received within each tubular member 12A. The shafts 12B may be provided with a series of longitudinally spaced transverse holes, and the tubular members 12A provided with a transverse hole for receiving a bolt 12C and nut 12D. A foot pad 12E is secured to the outer end of each shaft 12B. The radial distance of the foot pads 12E relative to the cylinder 11 is accomplished by aligning the appropriate hole in the tubular members and shafts, installing the bolt, and securing it with the nut.

OPERATION

The operation of the internal hydraulic pipe pushing apparatus 10 should be obvious from the description of the preferred embodiment, but will be stated in detail for clarity.

An excavation is made for the purpose of making repairs to an underground pipeline. Then a break in the pipeline is made adjacent to the section of the pipeline which is in need of repair.

With the two sets of legs 12 assembled, the hydraulic cylinder 11 is placed inside one part 28 of an existing underground pipe at an end adjacent to the part 29 of the existing underground pipe in need of repair. As noted above, the two sets of legs 12 have adjustable legs 12A which are locked in place with a radial length about one inch less than the radius of the pipe to allow hydraulic cylinder 11 to be lowered into place, as required, inside the one part of the existing underground pipe.

The hydraulic cylinder lock plate 13 (of a length longer than the diameter of the existing underground pipe) is secured between flanges 24 and 25 and positioned to abut the end of pipe section 28. The lock place 13 acts to anchor the hydraulic cylinder 11 in place when the hydraulic pressure is applied. The lock place 13 may press against the end of existing underground pipe section 28 or fit into a notch made therein to prevent slippage. The head or push plate 14 attached to the ram or piston 22 of the hydraulic cylinder 11 contacts the end of pipe section or liner 30 which is to be pushed into the existing underground pipe 29 which is in need of repair.

Pressure is then applied to the hydraulic cylinder 11 is controlled by the hydraulic three-way control valve 15 which has a by-pass valve 16. Regulator 17 is included to regulate the pressure applied to the hydraulic cylinder 11. The system pressure is monitored by reading a pressure gauge 18. Pressurization of the system by pump 19 causes cylinder 11 to move ram or piston 22 to press plate 14 against the end of pipe or liner 30 to press it into the pipe section 29 to be repaired. Reversal of three-way valve 15 causes piston 22 to retract and move plate 14 away from pipe liner 30 for further use.

While this invention has been described fully and completely with special emphasis upon the preferred embodiment, it should be understood that, with the scope of the appended claims, the invention may be practiced otherwise than as specifically described herein.

I claim:

1. A hydraulic pipe pushing apparatus comprising:
   a hydraulic cylinder,
   a control valve for selectively activating said hydraulic cylinder,
   two sets of three radially-extending, equally-spaced legs adjustably secured on said hydraulic cylinder longitudinally spaced thereon,
   means to lock said legs in an extended position during use to center said apparatus inside a pipe,
   a lock plate attached to said hydraulic cylinder, and
   a piston extending from said hydraulic cylinder,
   a push plate attached to said piston at the end thereof for pushing pipe through an existing underground pipe when said hydraulic cylinder is activated.

2. An internal hydraulic pipe pushing apparatus according to claim 1 in which:
   said lock plate is removably secured on said hydraulic cylinder.

3. An internal hydraulic pipe pushing apparatus according to claim 2 in which:
   said lock plate is a solid rectangular bar having a curved portion adapted for attaching said lock plate to said hydraulic cylinder.

4. An internal hydraulic pipe pushing apparatus according to claim 2 in which:
   said hydraulic cylinder has flanges defining a peripheral groove adjacent one end, and
   said lock plate is a solid rectangular bar having a curved portion removable fitted in said groove for attaching said lock plate to said hydraulic cylinder.

5. An internal hydraulic pipe pushing apparatus according to claim 1 in which:
   each of said legs is of a two-part telescoping construction, and
   said locking means locks said legs in the telescopically extended position.

6. An internal hydraulic pipe pushing apparatus according to claim 5 in which:
   said locking means comprises alignable apertures in said telescoping legs and pins insertable therein to secure the legs in a selected position.

7. An internal hydraulic pipe pushing apparatus according to claim 1 in which:
   said push plate is a solid rectangular plate.

8. An internal hydraulic pipe pushing apparatus according to claim 1 in which:
   said lock plate is a solid rectangular bar having a curved portion adapted for removably attaching said lock plate to said hydraulic cylinder,
   each of said legs is of a two-part telescoping construction, and
   said locking means locks said legs in the telescopically extended position.

9. An internal hydraulic pipe pushing apparatus according to claim 1 in which:
   said lock plate is a solid rectangular bar having a curved portion adapted for removably attaching said lock plate to said hydraulic cylinder,
   each of said legs is of a two-part telescoping construction, and
   said locking means comprises alignable apertures in said telescoping legs and pins insertable therein to secure the legs in a selected position.

10. An internal hydraulic pipe pushing apparatus according to claim 1 in which:
    said hydraulic cylinder has flanges defining a peripheral groove adjacent one end,
    said lock plate is a solid rectangular bar having a curved portion removable fitted in said groove for attaching said lock plate to said hydraulic cylinder,
    each of said legs is of a two-part telescoping construction, and
    said locking means locks said legs in the telescopically extended position.

11. An internal hydraulic pipe pushing apparatus according to claim 1 in which:
    said hydraulic cylinder has flanges defining a peripheral groove adjacent one end,
    said lock plate is a solid rectangular bar having a curved portion removably fitted in said groove for attaching said lock plate to said hydraulic cylinder,
    each of said legs is of a two-part telescoping construction, and
    said locking means comprises alignable apertures in said telescoping legs and pins insertable therein to secure the legs in a selected position.

12. An internal hydraulic pipe pushing apparatus according to claim 1 in which:
    said lock plate is a solid rectangular bar having a curved portion adapted for removably attaching said lock plate to said hydraulic cylinder,
    each of said legs is of a two-part telescoping construction, said locking means locks said legs in the telescopically extended position, and
    said push plate is a solid rectangular plate.

13. An internal hydraulic pipe pushing apparatus according to claim 1 in which:
    said lock plate is a solid rectangular bar having a curved portion adapted for removably attaching said lock plate to said hydraulic cylinder,
    each of said legs is of a two-part telescoping construction,
    said locking means comprises alignable apertures in said telescoping legs and pins insertable therein to secure the legs in a selected position, and
    said push plate is a solid rectangular plate.

14. An internal hydraulic pipe pushing apparatus according to claim 1 in which:
    said hydraulic cylinder has flanges defining a peripheral groove adjacent one end,
    said lock plate is a solid rectangular bar having a curved portion removable fitted in said groove for attaching said lock plate to said hydraulic cylinder,
    each of said legs is of a two-part telescoping construction,
    said locking means locks said legs in the telescopically extended position, and
    said push plate is a solid rectangular plate.

* * * * *